(12) United States Patent
Unno et al.

(10) Patent No.: US 7,641,016 B2
(45) Date of Patent: Jan. 5, 2010

(54) STRADDLE-TYPE VEHICLE

(75) Inventors: Toshio Unno, Shizuoka (JP); Ryousuke Asaoka, Shizuoka (JP); Hiroyuki Aoki, Shizuoka (JP)

(73) Assignee: Yamaha Hatsudoki Kabushiki Kaisha, Shizuoka-Ken (JP)

( * ) Notice: Subject to any disclaimer, the term of this patent is extended or adjusted under 35 U.S.C. 154(b) by 167 days.

(21) Appl. No.: 11/924,426

(22) Filed: Oct. 25, 2007

(65) Prior Publication Data

US 2008/0179126 A1    Jul. 31, 2008

(30) Foreign Application Priority Data

Oct. 27, 2006  (JP)  .............................. 2006-293064
Sep. 19, 2007  (JP)  .............................. 2007-243035

(51) Int. Cl.
  *B60K 41/12*    (2006.01)
(52) U.S. Cl. ........................................ 180/230; 474/69
(58) Field of Classification Search ................. 180/230; 701/51–52, 54, 56; 474/69–70; 477/44, 477/46
See application file for complete search history.

(56) References Cited

U.S. PATENT DOCUMENTS 5,924,954 A * 7/1999 Vukovich et al. ............. 477/46
5,947,861 A * 9/1999 Nobumoto .................... 477/37

FOREIGN PATENT DOCUMENTS

| JP | 04-131558 | 5/1992 |
| JP | 04-210156 | 7/1992 |
| JP | 07-119804 | 5/1995 |

* cited by examiner

*Primary Examiner*—Lesley Morris
*Assistant Examiner*—Levon Fiore
(74) *Attorney, Agent, or Firm*—Hogan & Hartson LLP (57) ABSTRACT

A straddle-type vehicle that can be accelerated rapidly by a simple operation irrespective of a selected drive mode includes a control unit that executes first control of switching between a plurality of drive modes A and B, and in each of at least two of the drive modes A and B, and second control of shifting the change gear to a kick-down state A1 or B1 in which the speed change ratio is lower than that of the drive mode A or B, according to operation of a shift-down operation member.

16 Claims, 10 Drawing Sheets

Fig. 10 ated continuously variable transmission.

STRADDLE-TYPE VEHICLE

RELATED APPLICATIONS

This application claims the benefit of priority under 35 USC 119 of Japanese patent application nos. 2006-293064, filed on Oct. 27, 2006, and 2007-243035, filed on Sep. 19, 2007, which applications are hereby incorporated by reference in their entireties.

BACKGROUND OF THE INVENTION

1. Field of the Invention

The present invention relates to straddle-type vehicles (for example, motorcycles), and more particularly, relates to a straddle-type vehicle equipped with an electronically controlled continuously variable transmission.

2. Description of Related Art

Straddle-type vehicles such as scooter-type motorcycles widely use a V-belt continuously variable transmission. A V-belt continuously variable transmission includes a pair of primary and secondary sheaves with variable groove widths, the primary sheave being disposed on a primary shaft to which the output of a power source such as an engine is input, and the secondary sheave being disposed on a secondary shaft which takes out the output to the driving wheel. A V-belt is wound around both sheaves, and the winding diameters of the V-belt around the sheaves are adjusted by changing the groove widths of each of the sheaves by a groove-width adjusting mechanism, so that the speed change ratio between both sheaves is controlled in a stepless manner.

The primary sheave and the secondary sheave are generally each composed of a fixed flange and a moving flange between which a V-groove is formed. Each moving flange is movable along the axis of the primary shaft or the secondary shaft. The moving flange is moved by a groove-width adjusting mechanism so that the speed change ratio can be controlled in a stepless manner.

Some conventional V-belt continuously variable transmissions of this type use an electric motor to move the moving flange of the primary sheave to adjust the groove width. This structure allows the groove width to be adjusted freely, since the moving flange can be moved in either a direction to decrease the groove width of the primary sheave (to Top), or in a direction to increase the groove width (to Low), by the moving thrust of the electric motor (for example, refer to Japanese Patent No. 3,043,061).

Scooter-type motorcycles equipped with a mechanism to electronically control a V-belt type continuously variable transmission change the speed change ratio automatically according to a program (map) input in advance for vehicle speed and engine speed (accelerator position) without the need for the operation of the rider. This provides the rider with ease of driving operability. For this reason, various attempts to apply this automatic continuously variable transmission to various types of vehicle have been made today.

Some motorcycles equipped with this type of automatic continuously variable transmission have a plurality of drive modes with different speed-change characteristics using a plurality of the above-mentioned programs (maps). For example, JP-A-7-119804 discloses a vehicle having programs (maps) for specifying a plurality of drive modes, in addition to a normal mode map for normal driving, a sports mode for frisky and agile driving and an engine braking mode for downhill runs. This vehicle allows the drive mode maps to be selected automatically according to a determination on the driving state of the vehicle (accelerator position, whether under braking or not), enabling the rider to perform accurate driving according to the driving state without any switching operation.

However, the vehicle of JP-A-7-119804 has the problem that the rider cannot switch among the maps for specifying the respective drive modes according to rider's intention because the maps are selected automatically; for example, the rider cannot accelerate freely even if the rider wants to increase speed sharply during passing or climbing a hill, or the rider cannot apply engine braking freely even if the rider wants to decrease speed before entering a curve.

SUMMARY OF THE INVENTION

The present invention has been made in light of such circumstances and provides a straddle-type vehicle that can be accelerated or decelerated by a simple operation irrespective of selected drive mode.

A straddle-type vehicle of the invention includes a control unit for controlling a continuously variable transmission, and a shift-down operation member. The control unit has a plurality of drive modes. The control unit executes first control of switching among the plurality of drive modes and second control of shifting, in at least two of the plurality of drive modes, the change gear to a shift-down state in which the speed change ratio is lower than that of each drive mode, according to the shift-down operation member.

According to the invention, in a straddle-type vehicle equipped with a control unit that electrically controls the speed change gear of a continuously variable transmission, a plurality of drive modes can be switched. Furthermore, the change gear in at least two of the drive modes can be shifted to a shift-down state in which the speed change ratio is lower than that of each drive mode according to the operation of a shift-down operation member. This arrangement allows temporary acceleration/deceleration by shift-down control while selecting the optimum drive mode according to driving state, thereby improving rider comfort.

Other features and advantages of the invention will be apparent from the following detailed description, taken in conjunction with the accompanying drawings which illustrate, by way of example, various features of embodiments of the invention.

DETAILED DESCRIPTION OF THE INVENTION

Embodiments of the invention are described herein with reference to the drawings, wherein like and corresponding parts in each of the several drawings are identified by the same reference character. It is to be understood that the invention is not limited to the following embodiments.

Figure 1:
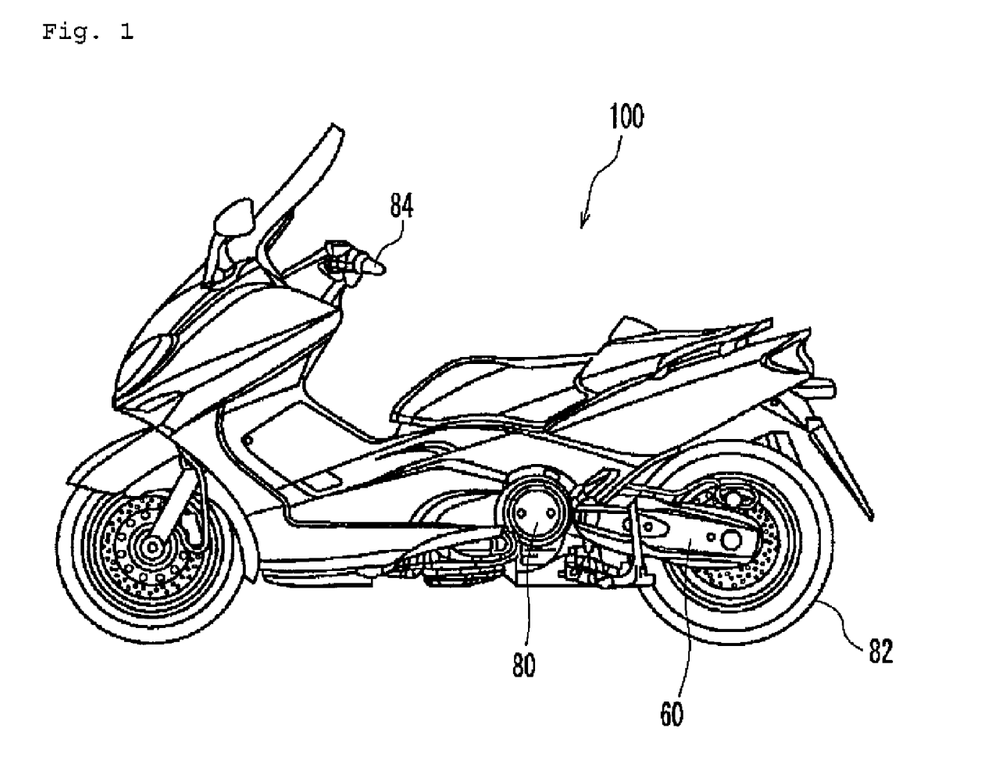
FIG. 1 is a side view of a straddle-type vehicle according to an embodiment of the invention.
Figure 2:
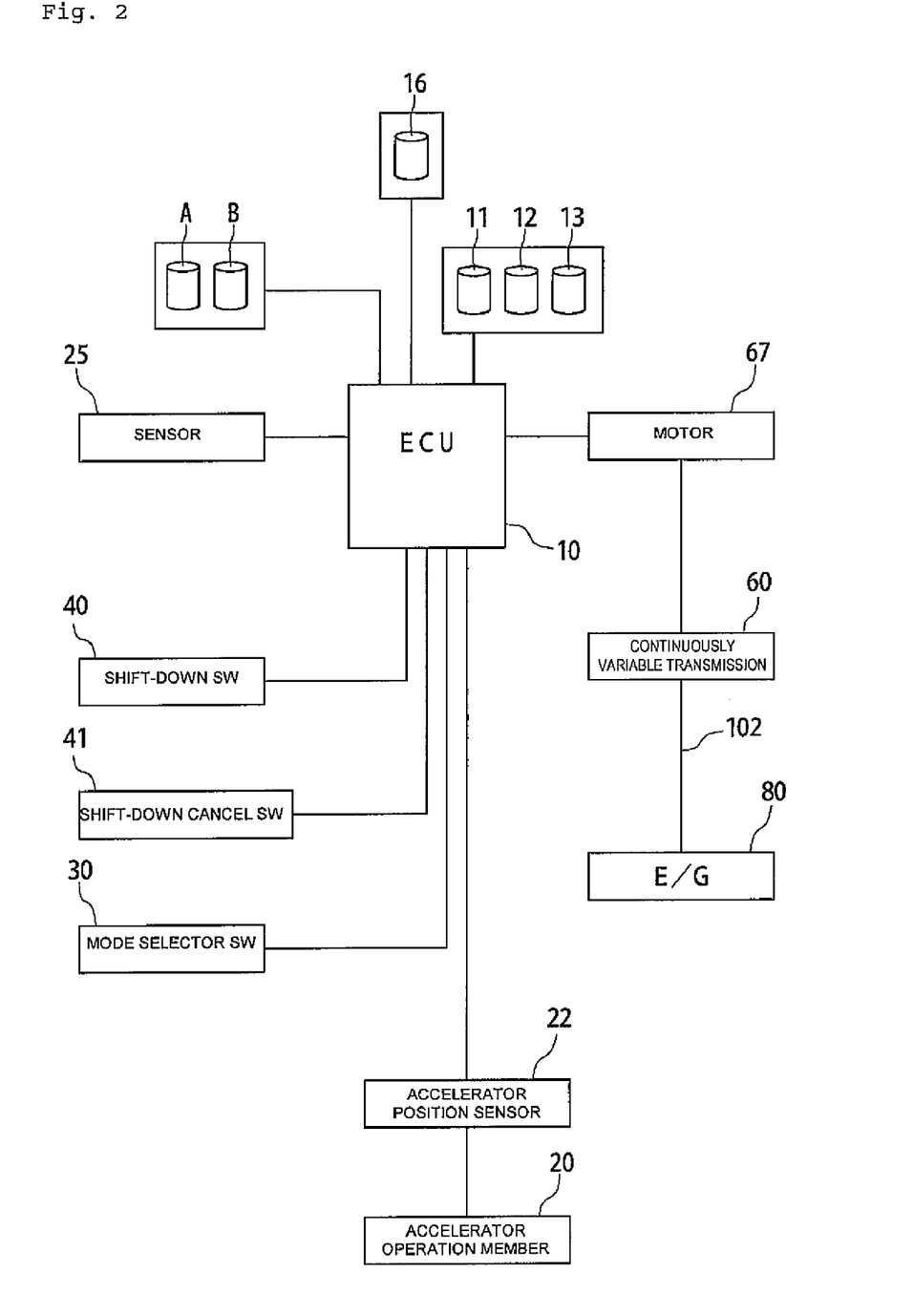
FIG. 2 is a block diagram for describing a control unit mounted to the straddle-type vehicle of the embodiment and the peripheral configuration thereof.
Figure 7:
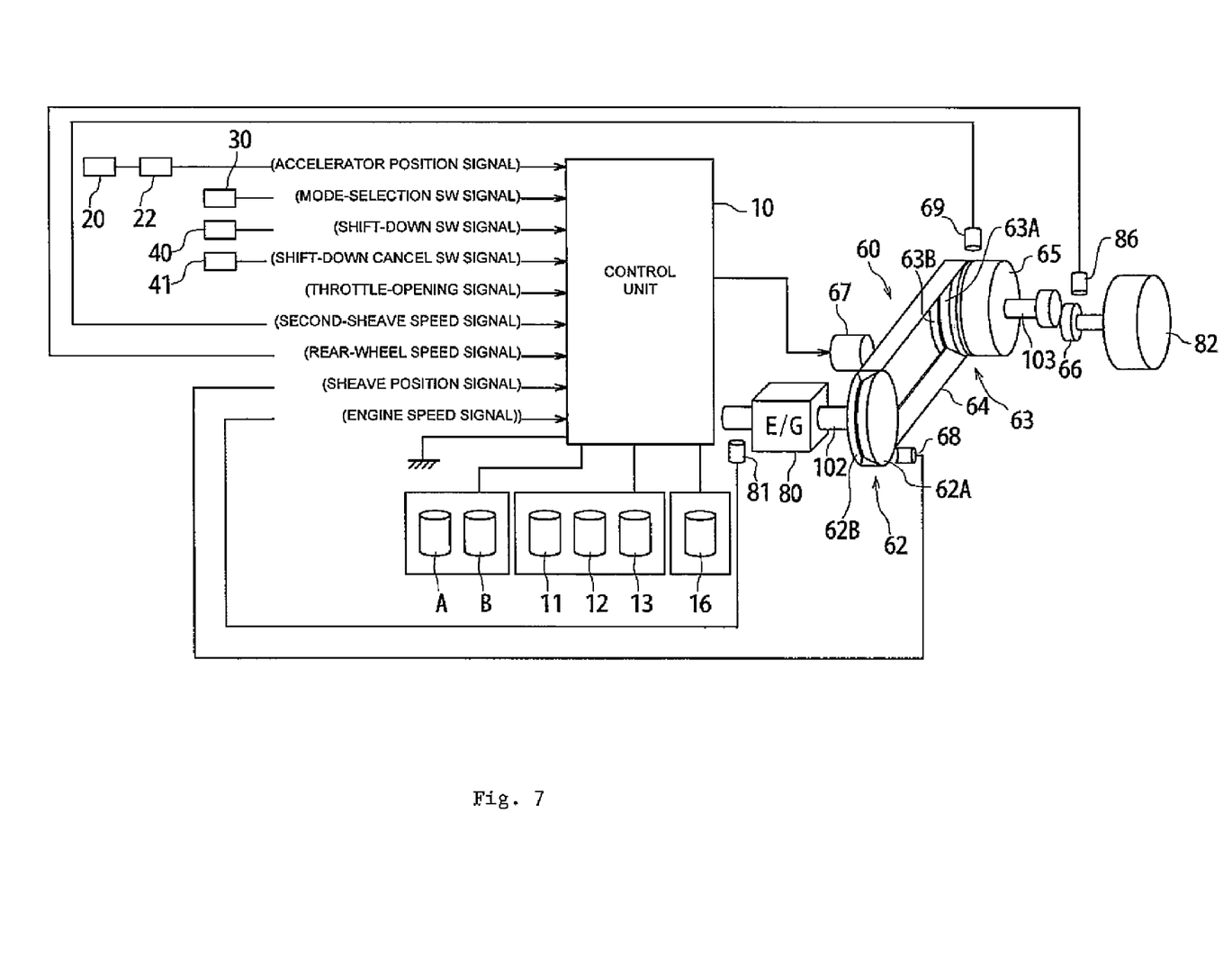
FIG. 7 is a block diagram showing the arrangement of a continuously variable transmission of an embodiment of the invention.

FIG. 1 is a side view of a straddle-type vehicle 100 according to an embodiment of the invention. FIGS. 2 and 7 are block diagrams for describing a control unit 10 mounted to straddle-type vehicle 100 and the peripheral configuration thereof.

As shown in FIGS. 2 and 7, straddle-type vehicle 100 includes a primary drive (engine) 80 whose output is controlled by an accelerator operation member 20 operated by a rider, a continuously variable transmission 60 connected to engine 80, and a control unit 10 that controls continuously variable transmission 60 electronically. Straddle-type vehicle 100 further includes a shift-down operation member 40. Control unit 10 has a plurality of drive modes A and B. Control unit 10 executes first control 11 of switching between drive modes A and B. Control unit 10 further executes second control 12 of shifting the speed change ratio of drive modes A and B to Low according to operation of shift-down operation member 40 in at least two of drive modes A and B. Control unit 10 executes various controls according to a predetermined program.

Straddle-type vehicle 100 shown in FIG. 1 is a scooter-type motorcycle. Driving force generated by engine 80 is transmitted to a rear (driving) wheel 82 via continuously variable transmission 60. Accelerator operation member 20 operated by the rider is an accelerator or an accelerator grip mounted to a handle 84.

Continuously variable transmission 60 of this embodiment is an electronically controlled V-belt type automatic continuously variable transmission. As shown in FIG. 2, the position of the moving sheave (not shown) of the primary sheave of V-belt type continuously variable transmission 60 is controlled by a sheave-position moving device 67 (in this embodiment, an electric motor). The primary sheave whose position is controlled by electric motor 67 is connected to a primary shaft 102 (for example, a crankshaft) rotated by engine 80.

Continuously variable transmission 60 can be operated in a plurality of switchable drive modes. Here, the "drive modes" mean speed change modes during driving. This embodiment employs a plurality of gear change modes with different speed change characteristics for continuously variable transmission 60. Specifically, continuously variable transmission 60 operates in two modes, a normal mode A (a so-called economic mode) in which economy is given a high priority in consideration of low fuel consumption and low noise and an assist I mode B (a so-called power mode) in which the output performance of the engine or the like is given a high priority. The drive modes can be switched manually according to operation based on the intention of a rider of straddle-type vehicle 100.

Figure 3:
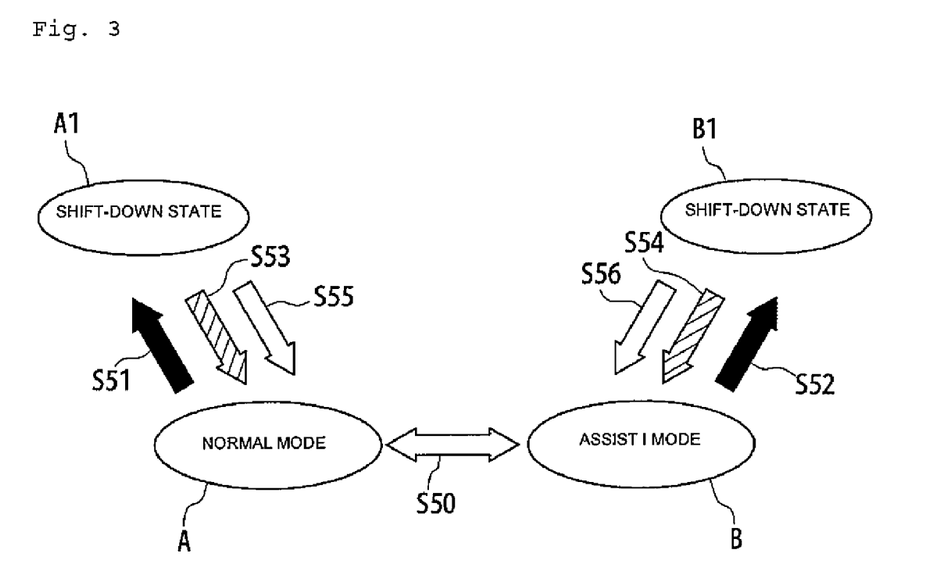
FIG. 3 is a diagram for describing the control of the control unit of the straddle-type vehicle.

Referring also to FIG. 3, a method of control by control unit 10 will be described. Control unit 10 executes first control 11 of switching the plurality of drive modes A and B. In this embodiment, control unit 10 can execute the control in such a manner as to switch the drive modes according to operation of a mode-selection operation member 30 by the rider, provided separately from accelerator operation member 20. In the example shown in FIGS. 2 and 3, the drive mode is switched between normal mode A and assist I mode B by control unit 10 (arrow S50).

Control unit 10 is electrically connected to a mode selector switch (mode selector SW) 30 as mode-selection operation member 30. Switching among the drive modes can be executed when the rider turns on mode selector switch 30. Mode selector switch 30 may be a mode switching button, for example.

Control unit 10 executes second control 12 of shifting the speed change ratio of at least two of drive modes A and B to Low according to operation of shift-down operation member 40. In this embodiment, second control 12 can be executed in all drive modes A and B set for control unit 10. Specifically, control unit 10 can execute control, in each of the two drive modes (normal mode A and assist I mode B), to shift the transmission to a shift-down state in which the speed change ratio is lower than that of each drive mode by rider operation of a shift-down operation member 40 provided separately from accelerator operation member 20. That is, when the drive mode is shifted from normal mode A to a shift-down state A1 (arrow S51), control unit 10 can shift the speed change ratio to Low from that of normal mode A, and when the drive mode is shifted from assist I mode B to a shift-down state B1 (arrow S52), control unit 10 can shift the speed change ratio from that of assist I mode B to Low.

In this embodiment, control unit 10 is electrically connected to a shift-down switch (a shift-down SW) 40 serving as a trigger for shifting to a shift-down state, as shift down operation member 40. The shift down operation can be executed by the rider's turning on shift-down switch 40. Shift-down switch 40 is a shift-down button (SD button), for example.

According to the embodiment of the invention, in straddle-type vehicle 100 equipped with control unit 10 which electrically controls the gear change of continuously variable transmission 60, control unit 10 executes control to switch between two drive modes, normal mode A and assist I mode B, and in each drive mode A or B, to shift the speed change ratio to Low (to A1 or B1) from each speed change ratio. According to the invention, the rider can accelerate temporarily from either drive mode by shift-down control while selecting the optimum drive mode from the two drive modes A and B according to driving conditions. This improves riding comfort. Moreover, the shift-down control allows temporary speed reduction (that is, speed reduction by engine braking).

With the above arrangement, for example, even in normal mode A (a mode in which the output performance of the engine or the like is reduced), the rider can accelerate quickly by a simple switching operation. This eliminates the need for switching to assist I mode B (a mode in which the output performance of the engine or the like is given a high priority) during passing or climbing a hill, allowing the rider to enjoy comfortable driving.

Since switching of drive modes is executed by the rider's switching operation, the rider can select the optimum drive mode freely. Moreover, since the shift to a shift-down state is also executed by the rider's switching operation, an appropriate acceleration/deceleration effect according to the rider's intention can be obtained.

While mode selector switch 30 and shift-down operation member 40 of this embodiment are separate switches, mode-selection operation member 30 may double as shift-down operation member 40. For example, one button may be used as both the mode-selection operation member and the shift-down operation member, wherein switching of the drive modes is executed by pressing and holding the button, and the shift to shift-down state is executed by tapping the button.

In this embodiment, switching between normal mode A and assist I mode B is executed manually by the rider (by switching operation). However, the invention is not limited to that, and the drive modes may be switched automatically. For example, a straddle-type vehicle having an automatic drive mode in which the drive modes are switched in accordance with the driving state of the vehicle may be provided. The automatic drive mode selection also allows shift to a shift-down state from the respective drive modes. Therefore, temporary acceleration/deceleration by shift-down control can be achieved, with the respective drive modes held.

Figure 4:
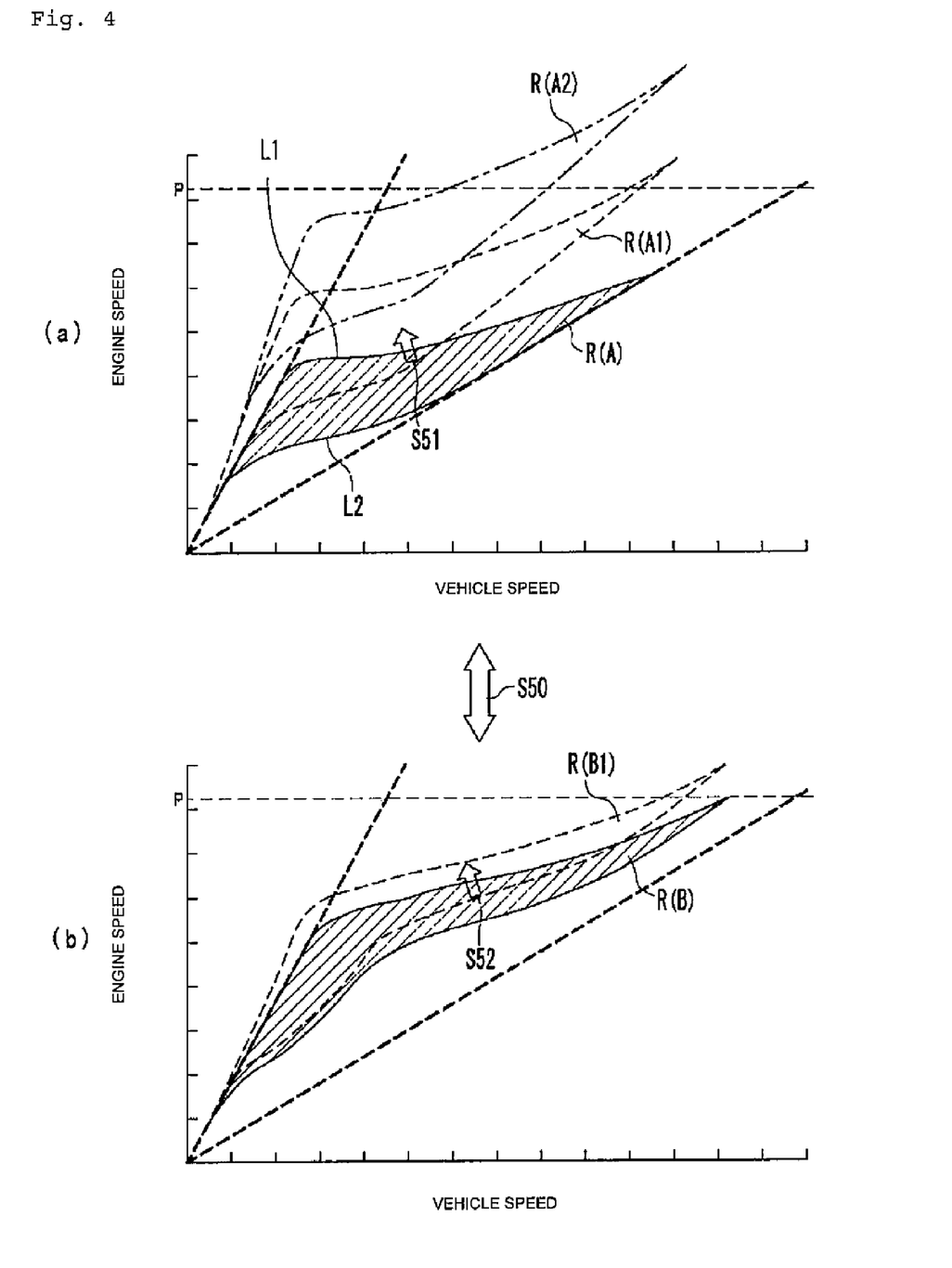
FIG. 4(a) is a diagram for describing a control map R(A) for a normal mode A.
FIG. 4(b) is a diagram for describing a control map R(B) for an assist I mode B.

Referring to FIGS. 4(*a*) and 4(*b*), control of the control unit of the continuously variable transmission will be described in detail.

Control unit 10 may be, for example, an electronic control unit (ECU) including a microprocessor unit (MPU). Control unit 10 calculates a speed change ratio according to the driving state of the vehicle (vehicle speed and throttle opening) from a registered control map (program), and sends a gear change instruction for achieving the speed change ratio to continuously variable transmission 60, thereby achieving the speed change ratio.

Control unit 10 calculates a target value of the speed change ratio (target speed change ratio) from the control map on the basis of information on vehicle speed and throttle opening and drives electric motor 67 so as to achieve the target speed change ratio, thereby controlling the position of the moving sheave of the primary sheave. The control map is stored in a storage section disposed in control unit 10. Alternatively, a storage unit which is electrically connected to control unit 10 may be provided outside control unit 10, in which the control map may be stored.

Examples of control maps are shown in FIGS. 4(*a*) and 4(*b*). FIG. 4(*a*) shows a control map R(A) set for control unit 10 in normal mode A. FIG. 4(*b*) shows a control map R(B) set for control unit 10 in assist I mode B. The graphs plot the relationship between vehicle speed and engine speed in the respective drive modes. FIG. 4 shows, with the same vehicle speed, the higher the engine speed, the lower the speed change ratio of the continuously variable transmission is set. Control maps (R(A) and R(B)) in the respective drive modes indicate the regions (control regions) specified by the respective control maps. The control regions are surrounded by line L1 indicative of the relationship between vehicle speed and target engine speed when the throttle is completely closed and line L2 indicative of the relationship between vehicle speed and target engine speed when the throttle is fully open.

In the example of the normal mode shown in FIG. 4(*a*), on execution of control for the normal mode, a target engine speed is calculated from information on vehicle speed and throttle opening. Specifically, a position on the horizontal axis in FIG. 4(*a*) is determined from information on vehicle speed. Then, a target engine speed is determined within the range of control map R(A) according to the throttle opening. In this case, the target engine speed is decreased (the change gear is shifted to Top so as to decrease the speed change ratio) as the vehicle speed and the throttle opening increase, and the target engine speed is increased (the change gear is shifted to Low so as to increase the speed change ratio) as the vehicle speed and the throttle opening decrease, thereby achieving smooth acceleration or deceleration.

Control unit 10 calculates a target engine speed by repeating the above calculation according to information on vehicle speed and throttle opening which change momentarily, thereby controlling the speed change ratio of continuously variable transmission 60.

A comparison between control map R(A) for normal mode A in FIG. 4(*a*) and control map R(B) for assist I mode B in FIG. 4(*b*) shows that, with the same vehicle speed, the engine speed is set higher in assist I mode B than in normal mode A. That is, the speed change ratio is set lower in assist I mode B than in normal mode A. The setting of the speed change ratio in assist I mode B lower allows more powerful acceleration to be achieved in assist I mode B than in normal mode A.

Control of control unit 10 is now described. First, control unit 10 can switch between the respective control maps of the drive modes shown in FIGS. 4(*a*) and 4(*b*) by rider operation of mode-selection operation member 30 (for example, pressing mode selector button 30) (arrow S50).

For example, to drive on a street without noise, the rider selects normal mode A so as to drive the vehicle gently and quietly. To increase engine output on a mountain path or the like, the rider selects assist I mode B so as to drive the vehicle crisply with high response.

Then, control unit 10 can shift the change gear to a shift-down state A1 or B1 in which the speed change ratio is shifted to lower than that of drive mode A or B by the rider operating shift-down operation member 40 (for example, by pressing the SD button). In the example illustrated, during driving in normal mode A of FIG. 4(*a*), control map R(A) for normal mode A shifts to the region R(A1) lower than the initial position (arrow S51), and during driving in assist I mode B of FIG. 4(*b*), control map R(B) for assist I mode B shifts to the region R(B1) lower than the initial position (arrow S52). The speed change ratios are thus temporarily shifted downward from those of the drive modes to enable driving using engine braking or to prevent slow acceleration during passing or climbing a hill.

The above arrangement allows acceleration in shift-down state A1 even from normal mode A. For example, this arrangement eliminates the need for acceleration after switching to assist I mode B to pass the preceding car while driving in normal mode A, allowing the rider to pass the target car by temporarily accelerating rapidly only by pressing a KD button, providing comfortable driving.

In this embodiment, shift from each drive mode to a shift-down state can be executed without switching between the control maps. That is, it is executed by multiplying a target speed change ratio calculated from the control map for each drive mode by a predetermined conversion factor. Specifically, a target engine speed in a shift-down state is set by multiplying an engine speed calculated from the control map of each drive mode by a predetermined conversion factor (for example, 1.35). The larger the predetermined conversion factor, the more the speed change ratio in a shift-down state is shifted to Low, thus providing higher engine output. The predetermined conversion factor is stored in a factor map format in a storage unit inside or outside the control unit.

The shift to a shift-down state from each drive mode can be executed with the control maps switched. Specifically, as a control map for specifying a shift-down state, a map in which the speed change ratio is set lower than the control map for each drive mode is stored in a storage unit in advance. After shifted to a shift-down state, a target speed change ratio is calculated using the control map for specifying a shift-down state. In this case, a return from the shift-down state to each drive mode is executed automatically when predetermined conditions are met. The automatic return from the shift-down state to each drive mode will be described later in detail.

The predetermined conversion factor for the multiplication may be different between the drive modes or the same. Multiplying by different conversion factors from one drive mode to another ensures the effects of kick-down control. For example, the control map for assist I mode B is set lower than that for normal mode A. Even if the control map is set to Low as described above, the conversion factor in assist I mode B can be smaller than that in normal mode A so as to provide sufficient shift-down effects (acceleration/deceleration effects of shift-down).

As shown in FIG. 4(a), a plurality of shift-down states can be set in each drive mode. In this case, a plurality of shift-down states is set to positions shifted to Low from the speed change ratio of each drive mode. FIG. 4(a) shows an example in which a shift-down state A2 is set lower than shift-down state A1 of normal mode A. Control unit 10 can execute control to shift to the shift-down states in sequence (in the example of FIG. 4(a), normal mode A→shift-down state A1→shift-down state A2) according to operation of shift-down operation member 40.

A method for canceling a shift-down state according to this embodiment will be described. As shown in FIGS. 2 and 7, control unit 10 includes a first setting section 16 for setting cancel conditions for canceling a shift-down state. Control unit 10 executes third control 13 of canceling the shift-down state according to the cancel conditions set by first setting section 16 to return to a drive mode before shifting to the shift-down state. Any cancel conditions to cancel the shift-down state can be set in first setting section 16 of control unit 10.

The cancel conditions of first setting section 16 for canceling the shift-down state include a predetermined operation of accelerator operation member 20. In this case, third control 13 is executed according to operation of accelerator operation member 20 set in first setting section 16. Specifically, the cancel conditions of first setting section 16 for canceling the shift-down state include a predetermined operation of accelerator operation member 20 to decrease the accelerator opening. Control unit 10 executes third control 13 according to operation of accelerator operation member 20 to decrease the accelerator opening. Third control 13 is executed according to a program preset in control unit 10.

In other words, control unit 10 can execute control to issue a shift-down cancel instruction according to the state of straddle-type vehicle 100, and cancel the shift-down state to return to each drive mode from the shift-down state (arrows S53 and S54). The state of straddle-type vehicle 100 can be detected by a sensor 25 that is electrically connected to control unit 10. The state of straddle-type vehicle 100 is that of other than shift-down operation member 40. Sensor 25 for detecting the state of straddle-type vehicle 100 is, for example, an accelerator position sensor (APS) 22 for detecting the state of accelerator operation member 20. In this case, the shift-down cancel instruction can be configured to be issued according to an accelerator position signal output from the accelerator position sensor.

Control unit 10 may be set so as to issue the shift-down cancel instruction according to an accelerator position signal indicative of a decrease in the accelerator opening of accelerator operation member 20. This arrangement allows the rider, when passing the preceding vehicle, to shift the transmission to a shift-down state and to open the accelerator to accelerate, and after overtaking the target vehicle, to return the accelerator (decrease the accelerator opening), thereby automatically returning to each drive mode from the shift-down state. The return from the shift-down state is thus operatively connected to accelerator operation member 20 which is responsive to the rider's intension. This also has the advantage of removing the need for a switch operation and simplifying the equipment. The decrement of the accelerator opening may be set as appropriate.

As an alternative, the shift-down cancel instruction may be issued according to various information during driving. For example, if sensor 25 for detecting the state of straddle-type vehicle 100 is a throttle opening sensor, the shift-down cancel instruction issued according to the state of straddle-type vehicle 100 is issued according to a throttle opening signal output from the throttle opening sensor. As another alternative, if sensor 25 is a vehicle speed sensor for detecting the speed of straddle-type vehicle 100, the shift-down cancel instruction issued according to the state (or the driving state) of straddle-type vehicle 100 may be issued when the vehicle speed is a predetermined level or less.

In this case, the canceling conditions of first setting section 16 to cancel the shift-down state may include detection of a predetermined throttle opening signal and detection of a vehicle speed lower than a predetermined speed at which the shift-down state is to be canceled.

As shown in FIG. 2, straddle-type vehicle 100 may include a shift-down cancel switch (shift-down cancel SW) 41 as a shift-down cancel operation member, and the conditions to cancel the shift-down state set in first setting section 16 may include a predetermined operation of shift-down cancel switch 41. In this case, third control 13 is executed according to the operation of shift-down cancel switch 41 set in first setting section 16.

This structure allows a method of returning to each drive mode according to the rider's intention (arrows S55 and S56) when a cancel button is pressed in conjunction with automatic return to the drive mode using various information during driving. That is, a shift-down cancel switch (for example, a shift-down cancel button) may be used as a shift-down cancel operation member 41 for issuing a shift-down cancel instruction to thereby return to each drive mode.

Not only automatic return to the drive mode using accelerator operation member 20, but also return to the drive mode using the cancel button, can be made. This arrangement ensures return to each drive mode by a simple operation, facilitating reflecting rider's intention.

The shift-down cancel switch of this embodiment may double as a mode-selection operation member (for example, mode selector SW 30). In other words, mode selector SW 30 may be used both as a shift-down cancel switch (for example, a shift-down cancel button), thereby allowing control, not in a shift-down state, to switch between the drive modes, and in a shift-down state, to return to each drive mode. That is, when straddle-type vehicle 100 is in a shift-down state, the common button can work as shift-down cancel switch 41, and when it is not in a shift-down state, the common button can work as mode selector switch 30.

The shared use of the shift-down cancel switch and mode selector SW 30 allows switching of drive modes and cancel from a shift-down state to be made with one switch. This simplifies the structure around the switch and prevents complication of the switching operation. The structure simplifies the equipment, offering the advantage of reducing the cost for the switches.

As an alternative, shift-down cancel switch 41 may double as shift-down operation member 40. For example, the first pressure of shift-down operation member 40 may enable shift to a shift-down state, and the second pressure may enable return to each drive mode. As another alternative, the difference in function between shift-down operation member 40 and shift-down cancel operation member 41 may be provided by a difference in the way of pressing button 40 (for example, press and hold or continuous press of two or more times).

Another embodiment of the invention is now described. This embodiment is a modification of the control unit of the straddle-type vehicle according to the above-described embodiment.

Figure 8:
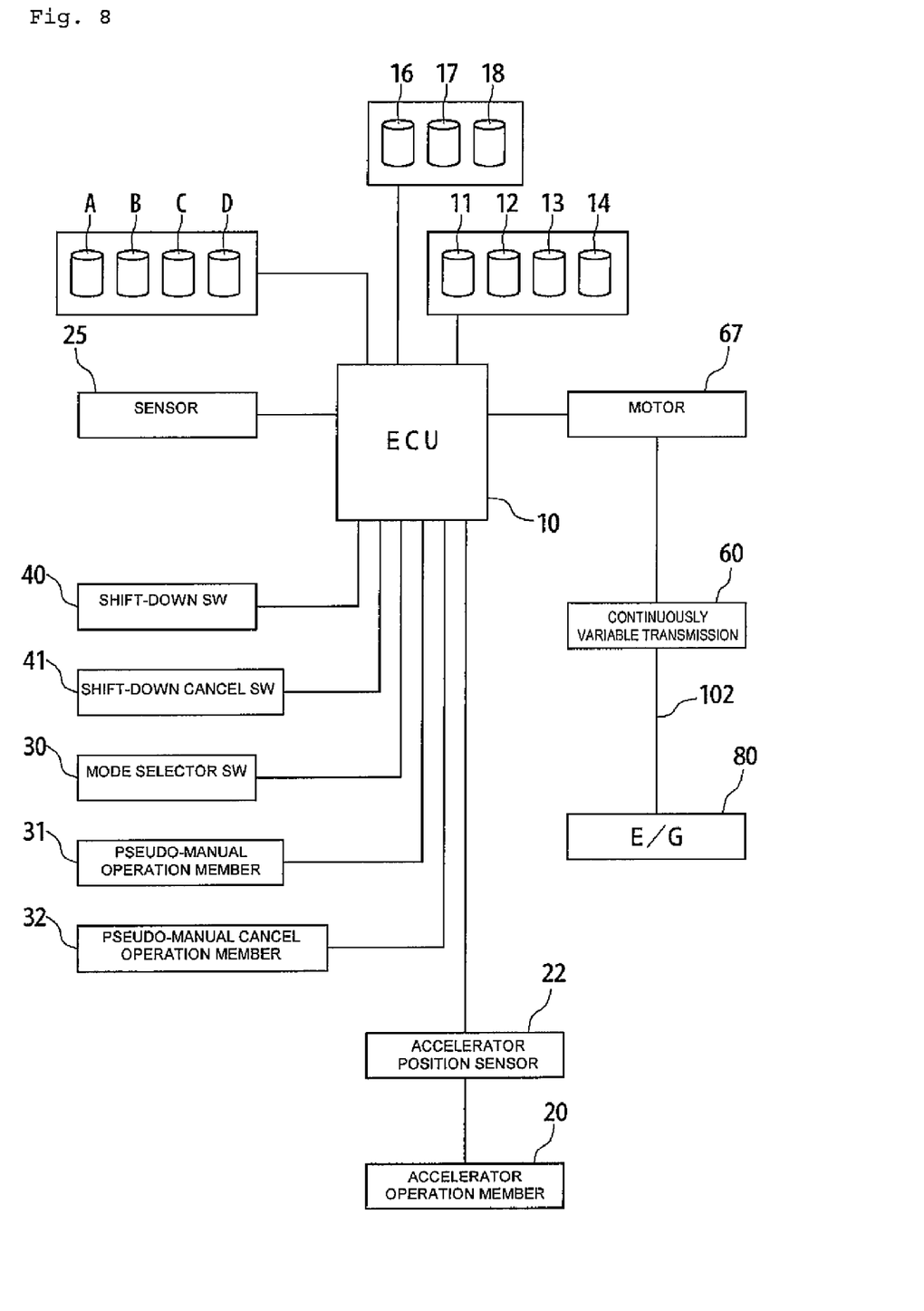
FIG. 8 is a block diagram for describing a control unit according to another embodiment of the invention and the peripheral configuration thereof.
Figure 9:
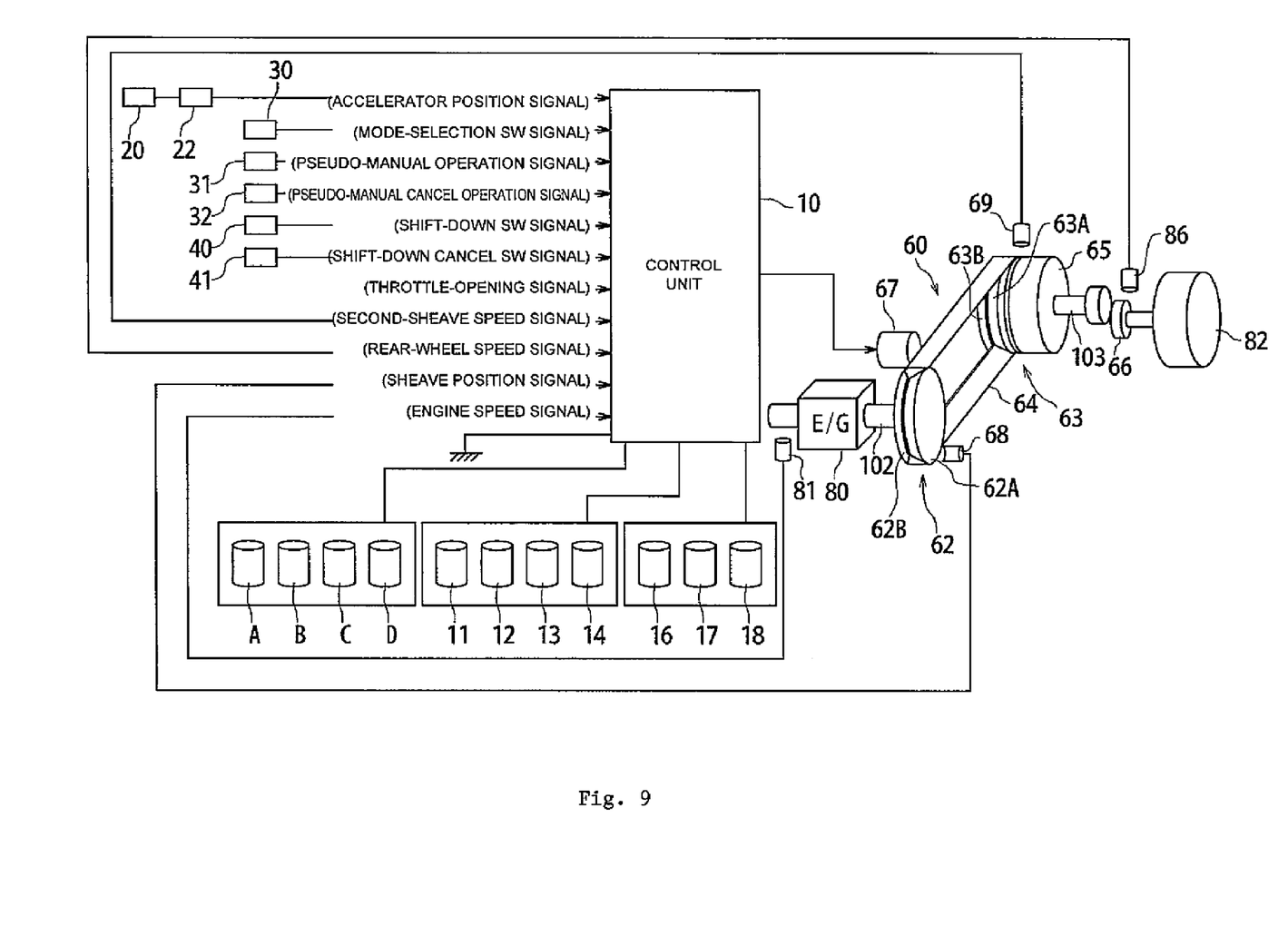
FIG. 9 is a block diagram showing the arrangement of a continuously variable transmission according to this embodiment of the invention.

In this embodiment, as shown in FIGS. 8 and 9, control unit 10 has a plurality of drive modes A, B, and C and a pseudo-manual mode D. Control unit 10 executes first control 11 of switching among drive modes A, B, and C. Control unit 10 further executes second control 12 of shifting the change gear to a shift-down state in all drive modes A, B, and C. Control unit 10 includes a second setting section 17 for setting conditions for shifting to pseudo-manual mode D. Control unit 10 executes fourth control 14 of shifting to pseudo-manual mode D in at least one drive mode C of drive modes A, B, and C according to the predetermined conditions set in second setting section 17. In this embodiment, control unit 10 is configured to execute the fourth control according to operation of accelerator operation member 20 to increase the accelerator opening in a moment.

A straddle-type vehicle 200 according to this embodiment is different from straddle-type vehicle 100 in that it has not only normal mode A and assist I mode B but also an assist II mode C.

The continuously variable transmission of straddle-type vehicle 200 has three drive modes (normal mode A, assist I mode B, and assist II mode C). Added assist II mode C principally has the same speed-change characteristics as those of assist I mode B, and can be shifted to a pseudo-manual mode D under predetermined conditions in which the output performance of the engine or the like is given the highest priority. In other words, the difference between assist II mode C and assist I mode B depends on whether shift to pseudo-manual mode D is permitted. "Pseudo-manual" means gear change that provides continuous acceleration with the fixed speed change ratio as in a manual transmission (MT) even in an automatic transmission (AT).

Control unit 10 of straddle-type vehicle 200 executes control to shift assist II mode C to pseudo-manual mode D, that is, to shift the speed change ratio so that engine output becomes close to maximum according to an acceleration position signal indicative of an instantaneous increase in the accelerator opening of accelerator operation member 20 (arrow S74). In other words, control unit 10 can execute control to shift the transmission to pseudo-manual mode D when the rider opens accelerator operation member 20 rapidly.

Figure 6:
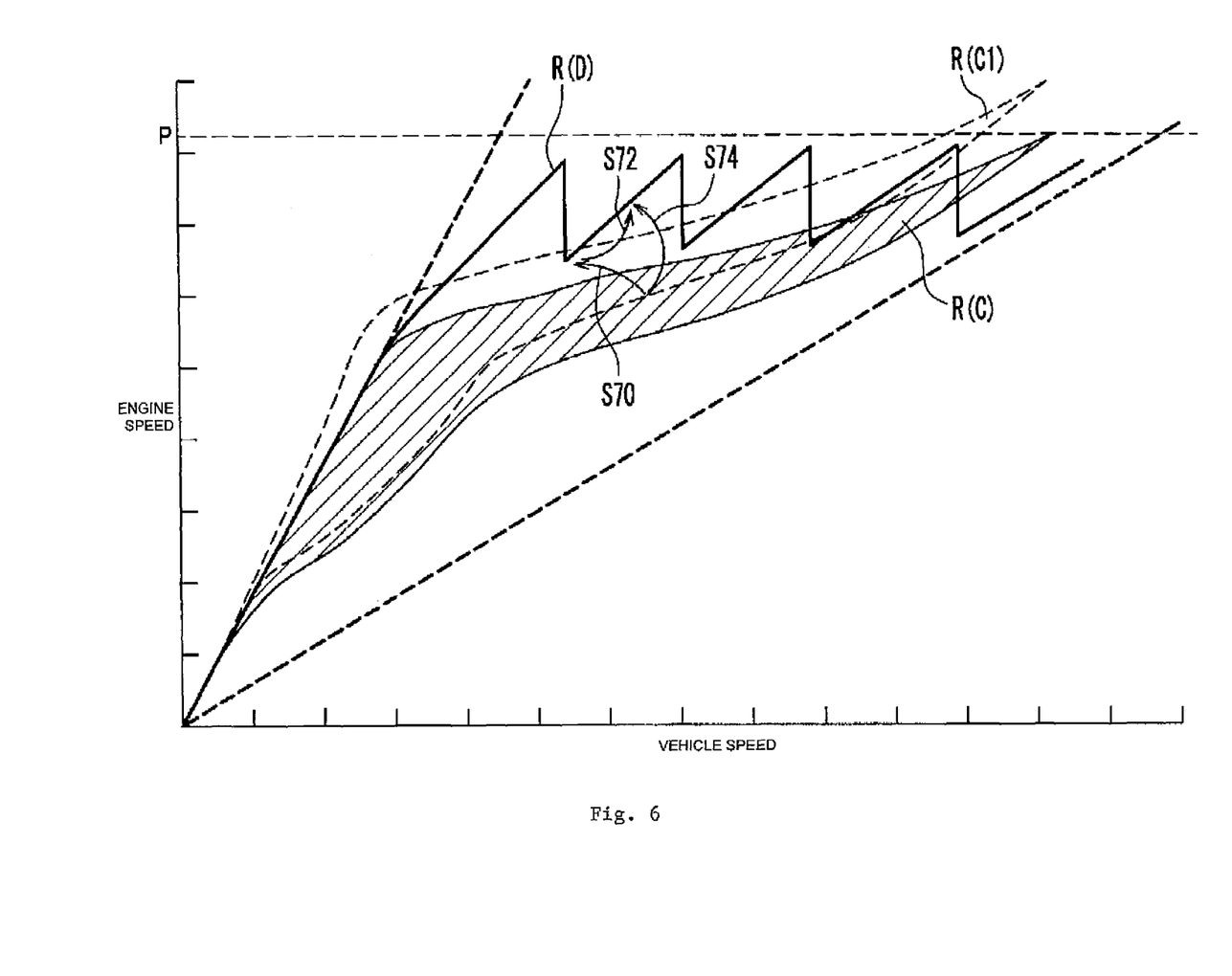
FIG. 6 is a diagram for describing a control map R(C) for an assist II mode C.

Referring also to FIG. 6, the control to shift the transmission to pseudo-manual mode D will be described. FIG. 6 shows a control map R(C) set for assist II mode C.

As described above, assist II mode C principally has the same speed-change characteristics as those of assist I mode B. That is, control map R(C) for assist II mode is the same as that for assist I mode B.

When the rider opens the accelerator rapidly (for example, turns the accelerator grip rapidly) during driving in assist II mode, control unit 10 shifts the speed change ratio of assist II mode C to a line R (pseudo-manual mode D) in the neighborhood of the upper limit P of engine speed with the fixed speed change ratio according to an accelerator position signal indicative an instantaneous increase in the accelerator opening of accelerator operation member 20 (arrow S74). In this embodiment, line R (pseudo-manual mode D) is set so as to fluctuate up and down (in zigzags) because acceleration is made while the stepped fixed speed change ratios are switched with changes in the vehicle speed on the horizontal axis. Pseudo-manual mode D is a drive mode in which the speed change ratio changes stepwise with the vehicle speed. In this embodiment, it is achieved by controlling continuously variable transmission 60 along line R set in control unit 10.

The upper limit P of engine speed is set to the vicinity of maximum engine output. Thus, engine output can be increased in a stroke to accelerate the vehicle rapidly by increasing engine speed to the vicinity of the upper limit P of engine speed. In addition, since acceleration is made while the stepped fixed speed change ratios are switched with changes in vehicle speed, as indicated by line R(D), acceleration as in an MT can be achieved in spite of an AT, providing the rider with comfortable acceleration. Moreover, since shift to pseudo-manual mode D can be operatively connected to accelerator operation member 20 that may reflect the rider's intention, there is no need to operate another switch, providing the advantage of simplifying the equipment.

Instantaneous increment or decrement of accelerator opening can be determined from changes in accelerator opening. If accelerator operation member 20 is an accelerator grip, a change in accelerator opening is, for example, the rate of turn of the accelerator grip. Instantaneous increment in accelerator opening here may be set to a desired value as appropriate.

In this embodiment, the shift to pseudo-manual mode D is allowed also from a shift-down state C1. Specifically, the rider can shift the transmission to pseudo-manual mode D by shifting the transmission to shift-down state C1 by pressing the SD button (arrow S70) and then opening the accelerator rapidly (arrow S72). This arrangement allows a rider to drive when approaching a curve, for example, in such a manner as to shift the transmission to shift-down state C1 by pressing SD button 40, and turn the curve slowly by engine braking, and then accelerate sharply by rapidly opening the accelerator in pseudo-manual mode D.

The shift to pseudo-manual mode D may be executed according to the rider's intention (for example, with another pseudo-manual operation member 31 or another operation member) irrespective of the state of accelerator operation member 20.

Pseudo-manual mode D may be canceled according to conditions set in a third setting section 18 provided in control unit 10, in which conditions for canceling pseudo-manual mode D are preset. The conditions for canceling pseudo-manual mode D may be the same as those for canceling a shift-down state described above. That is, control unit 10 can cancel pseudo-manual mode D according to the cancel conditions preset in first setting section 16. When canceling pseudo-manual mode D, for example, control unit 10 may issue a pseudo-manual cancel instruction according to the state of straddle-type vehicle 200, thereby canceling the pseudo-manual state to return to assist II mode C (arrow S75).

Another example of the conditions for canceling pseudo-manual mode D is a state in which the rider has closed accelerator operation member 20. In this case, the pseudo-manual cancel instruction is issued according to an accelerator position signal indicative of a decrease in the accelerator opening of accelerator operation member 20. The decrement of the accelerator opening may be set to a desired value as appropriate.

Figure 5:
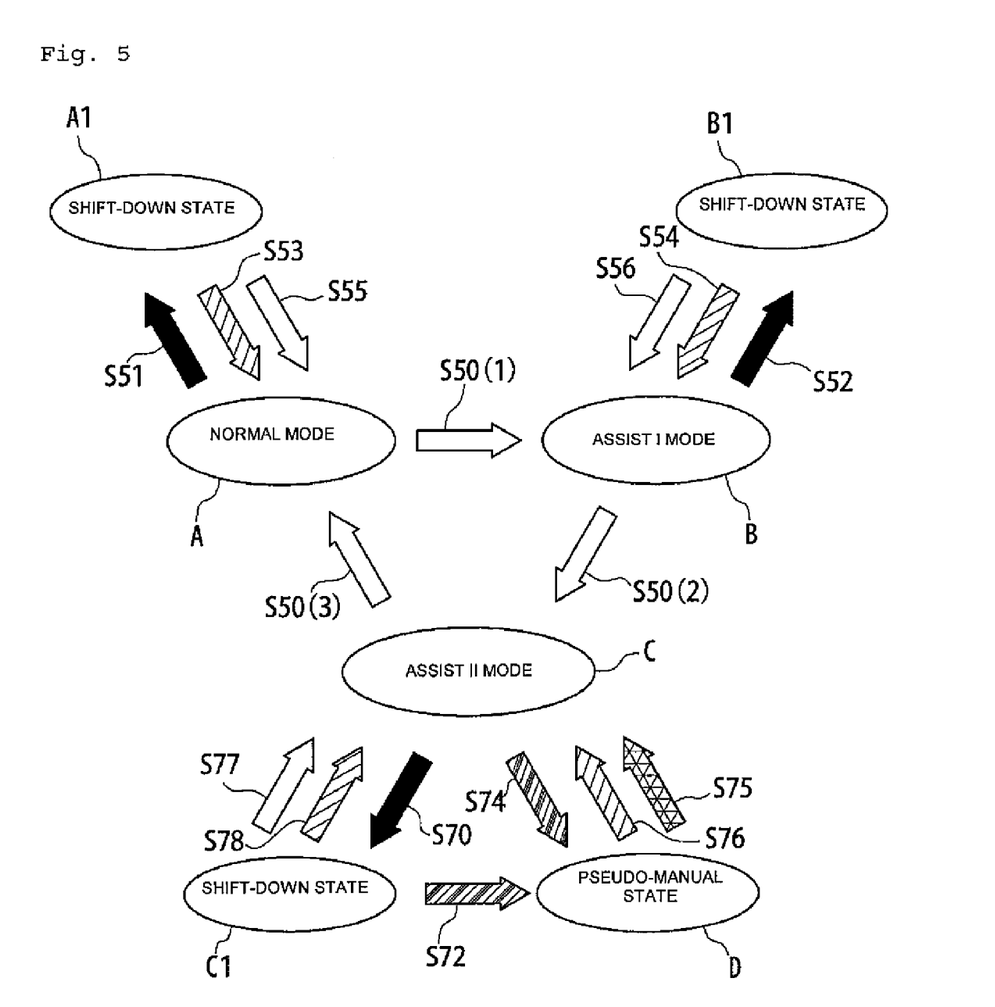
FIG. 5 is a diagram for describing the control of the control unit of a straddle-type vehicle according to another embodiment of the invention.

A pseudo-manual cancel operation member 32 for canceling pseudo-manual mode D may be provided separately. In this case, pseudo-manual mode D can be canceled when the rider presses the pseudo-manual cancel button. When pseudo-manual mode D is canceled, the change gear may be returned to assist II mode (C) as shown by arrow S76 in FIG. 5, for example. The conditions for canceling pseudo-manual mode D may be a combination of automatic cancel by a predetermined operation of accelerator operation member 20 and manual cancel by pseudo-manual cancel operation member 32.

Although the embodiment takes an example of shifting from assist II mode C to pseudo-manual mode D, the invention is not limited to that; control unit 10 may shift the transmission from at least one of the plurality of drive modes to pseudo-manual mode D. Thus, control to shift from normal mode A to pseudo-manual mode D is possible.

In this example, three drive modes A, B, and C are set. The rider can switch among drive modes A, B, and C in sequence by operating mode selector SW 30 (arrow S50(1) to arrow S50(3)). The rider can also shift the transmission from assist II mode C to shift-down state C1 according to operation of shift-down operation member 40 (arrow S70), or may cancel shift-down state C1 according to the state of accelerator operation member 20 and/or the pressure of the shift-down cancel switch (arrows S77 and S78). That is, the rider can shift the transmission from all three drive modes to a shift-down state.

As shown in this example, the arrangement in which the transmission can be shifted from all of the drive modes to a shift-down state allows rapid acceleration any time irrespective of a selected drive mode, further increasing the rider's comfort during driving. However, in this invention, the transmission may be shifted to a shift-down state from at least two of the drive modes, and a drive mode that cannot shift to a shift-down state may be included. For example, it is also possible to arrange to shift from four of the five drive modes to a shift-down state.

Referring to FIG. 7, the arrangement of continuously variable transmission 60 is described. As shown in FIG. 7, straddle-type vehicle 100 includes V-belt type continuously variable transmission 60 as a transmission mechanism for transmitting power from engine 80.

V-belt type continuously variable transmission 60 has a structure in which a primary sheave 62 is connected to a primary shaft 102 (for example, a crankshaft) rotated by engine 80, a secondary sheave 63 is connected to a secondary shaft 103 which outputs power to a rear wheel 82 (driving wheel) via a centrifugal clutch 65 and a reduction mechanism 66, and a V-belt 64 is stretched between primary sheave 62 and secondary sheave 63.

Primary sheave 62 includes a fixed sheave 62A and a moving sheave 62B, and secondary sheave 63 includes a fixed sheave 63A and a moving sheave 63B. Between fixed sheave 62A and moving sheave 62B and between fixed sheave 63A and moving sheave 63B are each formed a V-groove around which V-belt 64 is wound. The driving force of engine 80 is converted to rotating force for V-belt 64 by primary sheave 62, and the rotating force of V-belt 64 is transferred to rear wheel 82 via secondary sheave 63.

V-belt type continuously variable transmission 60 electrically moves moving sheave 62B of primary sheave 62 along the axis to adjust the width of the V-groove, so that the winding diameters of V-belt 64 around pulleys 62 and 63 change. Thus, the speed change ratio is controlled in a stepless manner between pulleys 62 and 63.

Continuously variable transmission 60 includes a sheave-position moving device (mainly composed of an electric motor) 67 for controlling the position of moving sheave 62B of primary sheave 62 and a sheave-position detecting device (corresponding to a mechanism for detecting an actual speed change ratio) 68 for detecting the position of moving sheave 62B. Moving sheave 62B is moved by sheave-position moving device 67 on the basis of the sheave position detected by sheave-position detecting device 68 to change the winding diameter of V-belt 64 wound around primary sheave 62.

This embodiment includes, as a sensor for detecting the speed of straddle-type vehicle 100, a secondary-sheave speed sensor 69 for detecting rotation of secondary sheave 63 upstream from centrifugal clutch 65 and a speed sensor 86 located downstream from centrifugal clutch 65 and in the vicinity of rear wheel 82, for directly detecting the speed of rear wheel 82. Secondary-sheave speed sensor 69 and rear-wheel speed sensor 86 detect speed signals proportional to vehicle speed, respectively. Straddle-type vehicle 100 may have only one of the sensors.

Straddle-type vehicle 100 of this embodiment has speed-change-ratio control unit (control unit) 10 for controlling the speed change ratio of continuously variable transmission 60 as a central element of the control system.

Speed-change-ratio control unit 10 is mainly composed of a microcomputer, to which an acceleration position signal output from acceleration-position sensor 22, a speed signal output from sheave speed sensor 69 or rear-wheel speed sensor 86, an engine speed signal output from an engine-speed sensor 81 for detecting the rotation speed of engine 80, a throttle-opening signal output from a throttle opening sensor (not shown), a sheave-position signal output from sheave-position detecting device 68, a main switch signal of a main switch for turning on/off the power system of the whole vehicle, and the like are input.

Control unit 10 controls engine 80 and the whole continuously variable transmission 60 according to the above various signals. Specifically, control unit 10 determines a target speed change ratio by calculating the vehicle speed and acceleration on the basis of the throttle-opening signal, the secondary-sheave speed, driving-wheel speed signal, the sheave-position signal and the like. Control unit 10 executes a so-called speed change control, or controlling the position of moving sheave 62B of primary sheave 62 by driving sheave-position moving device 67 to achieve the target speed change ratio, thereby controlling the actual speed change ratio of straddle-type vehicle 100.

The structure of the continuously variable transmission is not limited to the foregoing embodiments and may be applied to various continuously variable transmissions having a form in which a V-belt is wound around a primary sheave and a secondary sheave and in which the groove width of the primary sheave can be adjusted by a sheave-position moving device and a control unit.

Figure 10:
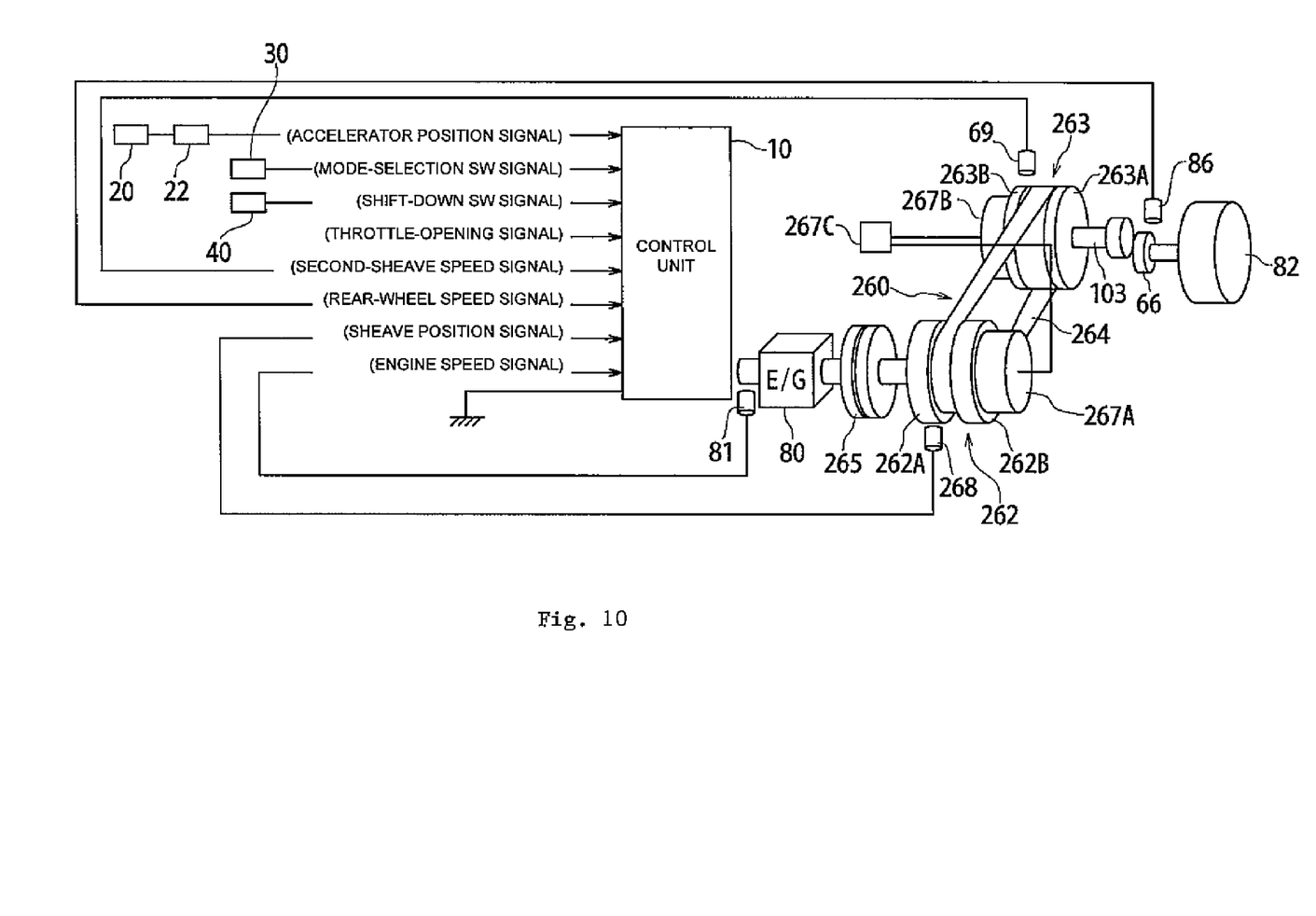
FIG. 10 is a block diagram showing the arrangement of a continuously variable transmission according to another embodiment of the invention.

As shown in FIG. 10, a continuously variable transmission having a metal V-belt may be employed. The components and parts in FIG. 10 that provide the same operations as those of the embodiment of FIG. 7 are given the same reference numerals.

In this embodiment, continuously variable transmission 260 having a metal V-belt (hereinafter, referred to as a metal-belt CVT as appropriate) is modified variously in addition to metal V-belt 264, as shown in FIG. 10.

Metal-belt CVT 260 includes a clutch 265, a primary rotation sensor 268, hydraulic cylinders 267A and 267B, and a hydraulic control valve 267C.

Clutch 265 is disposed between the output shaft of engine 80 and the input shaft of metal-belt CVT 260. Clutch 265 connects and disconnects transfer of power between the output shaft of engine 80 and the input shaft of metal-belt CVT 260.

Primary rotation sensor 268 detects the rotation speed of a primary sheave 262. In this embodiment, control unit 10 calculates the speed change ratio of continuously variable transmission 260 from the ratio of the rotation speed of primary sheave 262 detected by primary rotation sensor 268 to the vehicle speed of the straddle-type vehicle detected by vehicle speed sensor (the rear-wheel speed sensor in the drawing) 86. The speed change ratio of continuously variable transmission 260 may be calculated from the ratio of the rotation speed of primary sheave 262 detected by primary rotation sensor 268 to the rotation speed of a secondary sheave 263 detected by secondary-sheave speed sensor 69.

Hydraulic cylinder 267A adjusts the groove width of primary sheave 262 by applying pressure to a moving flange 262B of primary sheave 262. Hydraulic cylinder 267B adjusts the groove width of secondary sheave 263 by applying pressure to a moving flange 263B of secondary sheave 263. Hydraulic control valve 267C is a valve for adjusting the oil pressure to be applied to hydraulic cylinders 267A and 267B. When increasing the oil pressure of one of hydraulic cylinders 267A and 267B, hydraulic control valve 267C controls the oil pressure of the other of hydraulic cylinders 267A and 267B to be decreased. Hydraulic control valve 267C is controlled by control unit 10.

The speed change ratio of metal-belt CVT 260 is changed by operating hydraulic control valve 267C with control unit 10. Control of control unit 10 is similar to that of continuously variable transmission 60. Control unit 10 of metal-belt CVT 260 according to this embodiment uses the rotation speed of primary sheave 262 as the target value for control in place of the engine speed.

Although motorcycle 100 shown in FIG. 1 is a scooter-type motorcycle, the invention is not limited to that but may be applied to a motorcycle equipped with a control unit that electronically controls the gear change of a continuously variable transmission. The "motorcycle" of this specification includes, for example, a motorbike and a scooter. More generally, it includes any vehicle that can be turned with the body tilted. It can thus include tricycles and four-wheel cars (or more) in which the number of tires of at least one of front and rear wheels is two or more. The invention can be applied not only to motorcycles but also to other vehicles that can make use of the advantages of the invention; for example, so-called straddle-type vehicles including four-wheel buggies (all terrain vehicles (ATVs)) and snowmobiles. In the case of four-wheel buggies, the accelerator operation member may have, in addition to the shape of an accelerator grip, the shape of a lever. In addition, although an internal combustion engine is used as driving source 80, a straddle-type vehicle that uses a motor as driving source 80 may be provided.

While the invention has been described with reference to preferred embodiments, it should be understood that the invention is not limited to the description and that various modifications may be made.

According to the invention, a straddle-type vehicle is provided that can be accelerated rapidly by a simple operation irrespective of a selected drive mode.

The invention claimed is:

1. A straddle-type vehicle comprising:
a driving source whose output is controlled by an accelerator operation member;
a continuously variable transmission connected to the driving source;
a control unit for controlling the continuously variable transmission;
a shift-down operation member, wherein
the control unit has a plurality of drive modes and executes:
a first control of switching among the plurality of drive modes; and
a second control of shifting, in at least two of the plurality of drive modes, a change gear to a shift-down state in which a speed change ratio is lower than that of each drive mode, according to operation of the shift-down operation member, and
the control unit comprises a first setting section for setting cancel conditions for canceling the shift-down state, and executes third control of canceling the shift-down state according to the cancel conditions set by the first setting section to return to the drive mode before shifting to the shift-down state;
a shift-down cancel operation member, wherein
a predetermined operation of the shift-down cancel operation member is set in the first setting section as the cancel conditions for canceling the shift-down state, and
the third control is executed according to operation of the shift-down cancel operation member set in the first setting section; and
a mode-selection operation member for switching among the plurality of drive modes, wherein
the first control is executed according to operation of the mode-selection operation member, and
the shift-down cancel operation member and the mode-selection operation member are composed of one button.

2. The straddle-type vehicle according to claim 1, further comprising:
a mode-selection operation member for switching among the plurality of drive modes, wherein
the first control is executed according to operation of the mode-selection operation member.

3. The straddle-type vehicle according to claim 1, wherein
a predetermined operation of the accelerator operation member is set in the first setting section as the cancel conditions for canceling the shift-down state; and
the third control is executed according to operation of the accelerator operation member set in the first setting section.

4. The straddle-type vehicle according to claim 3, wherein the third control is executed according to operation of the accelerator operation member to decrease the accelerator opening.

5. The straddle-type vehicle according to claim 1, wherein the second control can be executed in all of the drive modes set in the control unit.

6. The straddle-type vehicle according to claim 1, wherein
the control unit has a pseudo-manual mode to change the speed change ratio of the continuously variable transmission stepwise with a vehicle speed; and
the control unit includes a second setting section for setting conditions for shifting to the pseudo-manual mode, wherein
the control unit executes fourth control of shifting at least one of the plurality of drive modes to the pseudo-manual mode according to predetermined conditions set in the second setting section.

7. The straddle-type vehicle according to claim 6, wherein a predetermined operation to increase the accelerator opening momentarily is set in the second setting section as the conditions for shifting to the pseudo-manual mode.

8. A continuously variable transmission controlled by a control unit, wherein the control unit has a plurality of drive modes and executes:
   a first control of switching among the plurality of drive modes; and
   a second control of shifting, in at least two of the plurality of drive modes, a change gear to a shift-down state in which a speed change ratio is lower than that of each drive mode, according to operation of the shift-down operation member, wherein
   the control unit has a pseudo-manual mode to change the speed change ratio of the continuously variable transmission stepwise with a vehicle speed,
   the control unit includes a second setting section for setting conditions for shifting to the pseudo-manual mode, and
   the control unit executes fourth control of shifting from the shift-down state to the pseudo-manual mode according to predetermined conditions set in the second setting section.

9. The continuously variable transmission according to claim 8, wherein the first control is executed according to operation of the mode-selection operation member.

10. The continuously variable transmission according to claim 8, wherein the control unit comprises a first setting section for setting cancel conditions for canceling the shift-down state, and executes third control of canceling the shift-down state according to the cancel conditions set by the first setting section to return to the drive mode before shifting to the shift-down state.

11. The continuously variable transmission according to claim 10, wherein
    a predetermined operation of the accelerator operation member is set in the first setting section as the cancel conditions for canceling the shift-down state; and
    the third control is executed according to operation of the accelerator operation member set in the first setting section.

12. The continuously variable transmission according to claim 11, wherein the third control is executed according to operation of the accelerator operation member to decrease an accelerator opening.

13. The continuously variable transmission according to claim 10, wherein
    a predetermined operation of the shift-down cancel operation member is set in the first setting section as the cancel conditions for canceling the shift-down state; and
    the third control is executed according to operation of the shift-down cancel operation member set in the first setting section.

14. The continuously variable transmission according to claim 8, wherein the second control can be executed in all of the drive modes set in the control unit.

15. The continuously variable transmission according to claim 8, wherein a predetermined operation to increase an accelerator opening momentarily is set in the second setting section as the conditions for shifting to the pseudo-manual mode.

16. A straddle-type vehicle comprising:
    a driving source whose output is controlled by an accelerator operation member;
    a continuously variable transmission connected to the driving source;
    a control unit for controlling the continuously variable transmission;
    a shift-down operation member, wherein
       the control unit has a plurality of drive modes and executes:
       a first control of switching among the plurality of drive modes; and
       a second control of shifting, in at least two of the plurality of drive modes, a change gear to a shift-down state in which a speed change ratio is lower than that of each drive mode, according to operation of the shift-down operation member;
    a shift-down cancel operation member for canceling the shift-down state; and
    a mode-selection operation member for switching among the plurality of drive modes,
       wherein the shift-down cancel operation member and the mode-selection operation member are composed of one button.

* * * * *